US012752746B2

(12) United States Patent
Cook et al.

(10) Patent No.: US 12,752,746 B2
(45) Date of Patent: Oct. 6, 2026

(54) BULK TRANSPORT VEHICLE CLEANING SYSTEM

(71) Applicant: Dimension Product Solutions LP, Crosby, TX (US)

(72) Inventors: George T. Cook, Crosby, TX (US); Burt Lusk, La Porte, TX (US)

(73) Assignee: Dimension Product Solutions LP, Crosby, TX (US)

( * ) Notice: Subject to any disclaimer, the term of this patent is extended or adjusted under 35 U.S.C. 154(b) by 288 days.

(21) Appl. No.: 18/607,309

(22) Filed: Mar. 15, 2024

(65) Prior Publication Data

US 2024/0217487 A1 Jul. 4, 2024

Related U.S. Application Data

(63) Continuation-in-part of application No. 17/818,894, filed on Aug. 10, 2022.

(51) Int. Cl.
*B60S 3/00* (2006.01)

(52) U.S. Cl.
CPC ............... *B60S 3/006* (2013.01); *B60S 3/008* (2013.01)

(58) Field of Classification Search
CPC .......... B60S 3/006; B60S 3/008; B08B 9/093; B08B 5/04; B08B 5/02; B08B 7/02
USPC .......................................................... 15/312.1
See application file for complete search history.

(56) References Cited

U.S. PATENT DOCUMENTS 4,055,870 A 11/1977 Furutsutsumi
4,677,917 A 7/1987 Dugge et al.
5,584,939 A * 12/1996 Dahlin ...................... B08B 7/02 451/39
2003/0005542 A1* 1/2003 Ennis ...................... B60S 3/008 15/345
2007/0226950 A1 10/2007 Demarco
2015/0183308 A1* 7/2015 Buley ...................... B60J 7/185 49/386
2024/0050997 A1 2/2024 Cook et al.

FOREIGN PATENT DOCUMENTS

CN 105459970 A 4/2016
CN 105946809 A 9/2016
CN 105459970 B 10/2017
CN 105946809 B 12/2017
GB 2258828 A * 2/1993 ............ B01D 46/76

* cited by examiner

*Primary Examiner* — Katina N. Henson
(74) *Attorney, Agent, or Firm* — Greer, Burns & Crain, Ltd

(57) ABSTRACT

A bulk transport vehicle cleaning system is provided and includes a storage compartment having walls and an inlet and an outlet, a vacuum unit movably attached to an inner surface of at least one of the walls of the storage compartment, wherein the vacuum unit is configured to move along the inner surface and suction residual material and dust from the inner surface, a filter system connected to the outlet and a vacuum generator connected to the filter system, wherein the vacuum generator generates a vacuum within the storage compartment of the bulk transport vehicle so that air flows from the inlet of the storage compartment toward the vacuum generator, and wherein the filter system removes material and particles from the air.

14 Claims, 7 Drawing Sheets

BULK TRANSPORT VEHICLE CLEANING SYSTEM

CROSS-REFERENCE TO RELATED APPLICATION

This application is a continuation-in-part of prior U.S. application Ser. No. 17/818,894, filed Aug. 10, 2022, which is incorporated herein in its entirety.

BACKGROUND

The present application relates generally to a cleaning system for railcars, and more particularly to a pneumatic cleaning system for railcars that is more efficient and reduces costs associated with the cleaning process and the processing of waste generated by the cleaning process.

The conventional cleaning process for railcars, which are used to ship granular dry bulk solids (contaminant sensitive commodities, such as plastic pellets or commodities that require cleaning between shipments of various grades and types), is to use pressurized (sometimes heated) water or water with chemical additives to wash the interior surfaces of railcars, via the top hatches, of the railcars, and collect the dirty water and washed out materials through the lower discharge outlets of the railcars. The dirty water resulting from the cleaning process must be contained, screened and treated. Similarly, the collected washed out materials must be either disposed of or dried for recycling or disposal. Additionally, the interior of the railcar must be dried using heated, pressurized air.

The entire cleaning process is costly and requires special equipment, facilities, permits and personnel. As such, the conventional cleaning process is energy inefficient due to the multi-stage process, which yields waste water and waste materials that must be further treated to meet government standards for disposal or recycling. The process is also environmentally risky due to the chemicals used to treat the water and inherent risk of treating water which will be released back into the environment that could contain chemicals or contaminants.

In some cases, railcars are sent to be cleaned and contain large amounts of unintentionally unloaded materials, or in the terminology of the industry, a heel. In these cases, the railcars may need to be moved to another location for unloading, which is wasteful and costly, or the cleaning process is used in which the inefficiencies of the cleaning process are compounded due to handling large amounts of materials, rather than the expected residual amounts of materials withing the railcars.

Therefore, it is desirable to provide a railcar cleaning system that enhances efficiency, reduces costs and reduces waste materials that require further processing after the cleaning process.

SUMMARY

The present railcar cleaning system is configured for cleaning an interior space of one or more compartments of a railcar by generating a high velocity vacuum within the interior space to remove materials remaining within each compartment. By using solely air without any water or chemical additives, the present railcar cleaning system is energy efficient and cleans the interior space of the railcar efficiently with minimal impact on the environment thereby reducing the costs and time associated with cleaning compartments of a railcar.

In an embodiment, a railcar cleaning system is provided and includes a railcar having a compartment with an inlet and an outlet, a filter system connected to the outlet and a vacuum generator connected to the filter system, where the vacuum generator generates a vacuum within the compartment of the railcar so that air flows from the inlet of the compartment toward the vacuum generator, and wherein the filter system removes material and particles from the air.

In another embodiment, a railcar cleaning system is provided and includes a railcar having a plurality of compartments, where each of the compartments including an inlet and an outlet, a filter system connected to the outlet of each of the compartments and a vacuum generator connected to the filter system, wherein the vacuum generator generates a vacuum within each of the compartments of the railcar so that air flows from the inlet of each compartment toward the vacuum generator, and wherein the filter system removes material and particles from the air.

In a further embodiment, a bulk transport vehicle cleaning system is provided and includes a vacuum unit movably attached to an inner surface of at least one wall of a storage compartment of a bulk transport vehicle, the storage compartment having an inlet and an outlet, where the vacuum unit is configured to move along the inner surface and suction residual material and dust from the inner surface, a filter system connected to the outlet and a vacuum generator connected to the filter system, where the vacuum generator generates a vacuum within the storage compartment of the bulk transport vehicle so that air flows from the inlet of the storage compartment toward the vacuum generator, and where the filter system removes material and particles from the air.

In another embodiment, a bulk transport vehicle cleaning system is provided and includes a plurality of storage compartments of a bulk transport vehicle, each of the storage compartments including a plurality of walls, an inlet and an outlet, a vacuum unit movably attached to an inner surface of at least one of the walls of one or more of the storage compartments, where the vacuum unit is configured to move along the inner surface and suction residual material and dust from the inner surface, a filter system connected to the outlet and a vacuum generator connected to the filter system, where the vacuum generator generates a vacuum within at least one of the storage compartments of the bulk transport vehicle so that air flows from said inlet of the at least one of the storage compartments toward said vacuum generator, and wherein said filter system removes material and particles from the air.

DETAILED DESCRIPTION

The present railcar cleaning system includes a pneumatic assembly that generates air flow through an interior of a railcar for cleaning the interior space and interior surfaces of the railcar without using water or other chemicals, where the present railcar cleaning system is more efficient, cost effective and environmentally friendly than conventional railcar cleaning systems.

Figure 1:
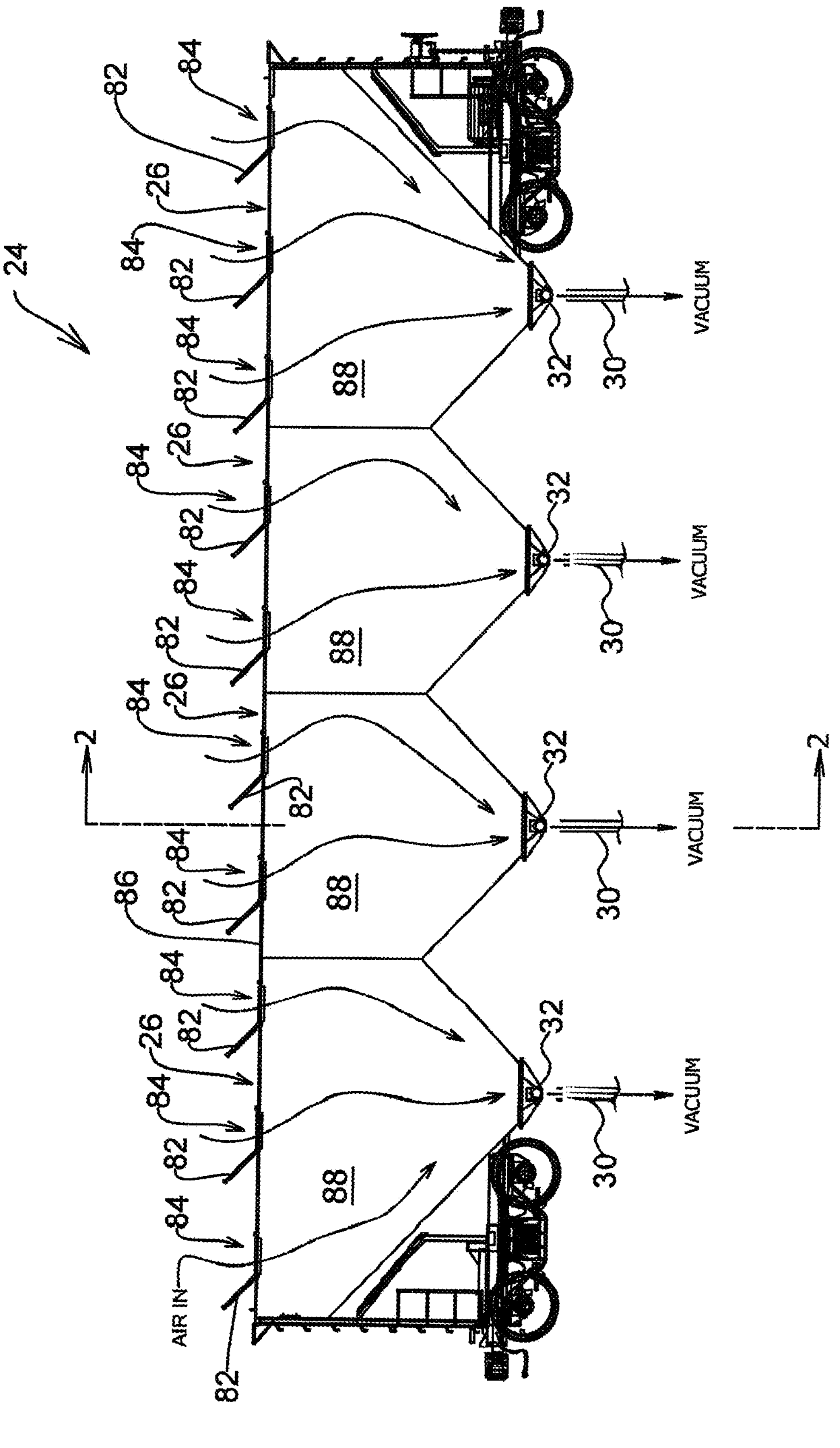
FIG. 1 is a side view of a railcar showing air flow through the railcar generated by the present cleaning system.
Figure 2:
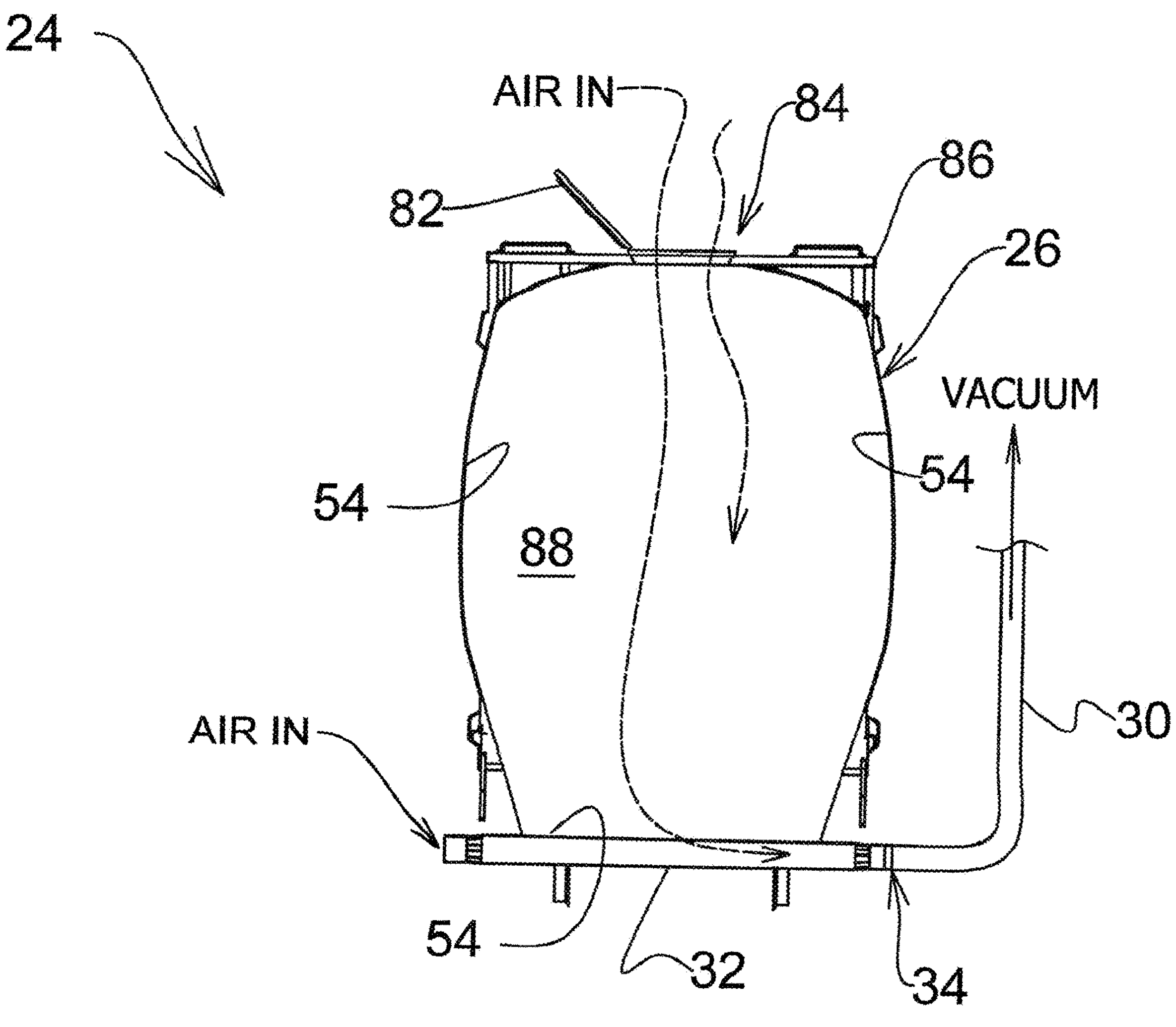
FIG. 2 is a cross-sectional view of the railcar of FIG. 1 taken substantially along line 2-2 in the direction generally indicated.
Figure 3:
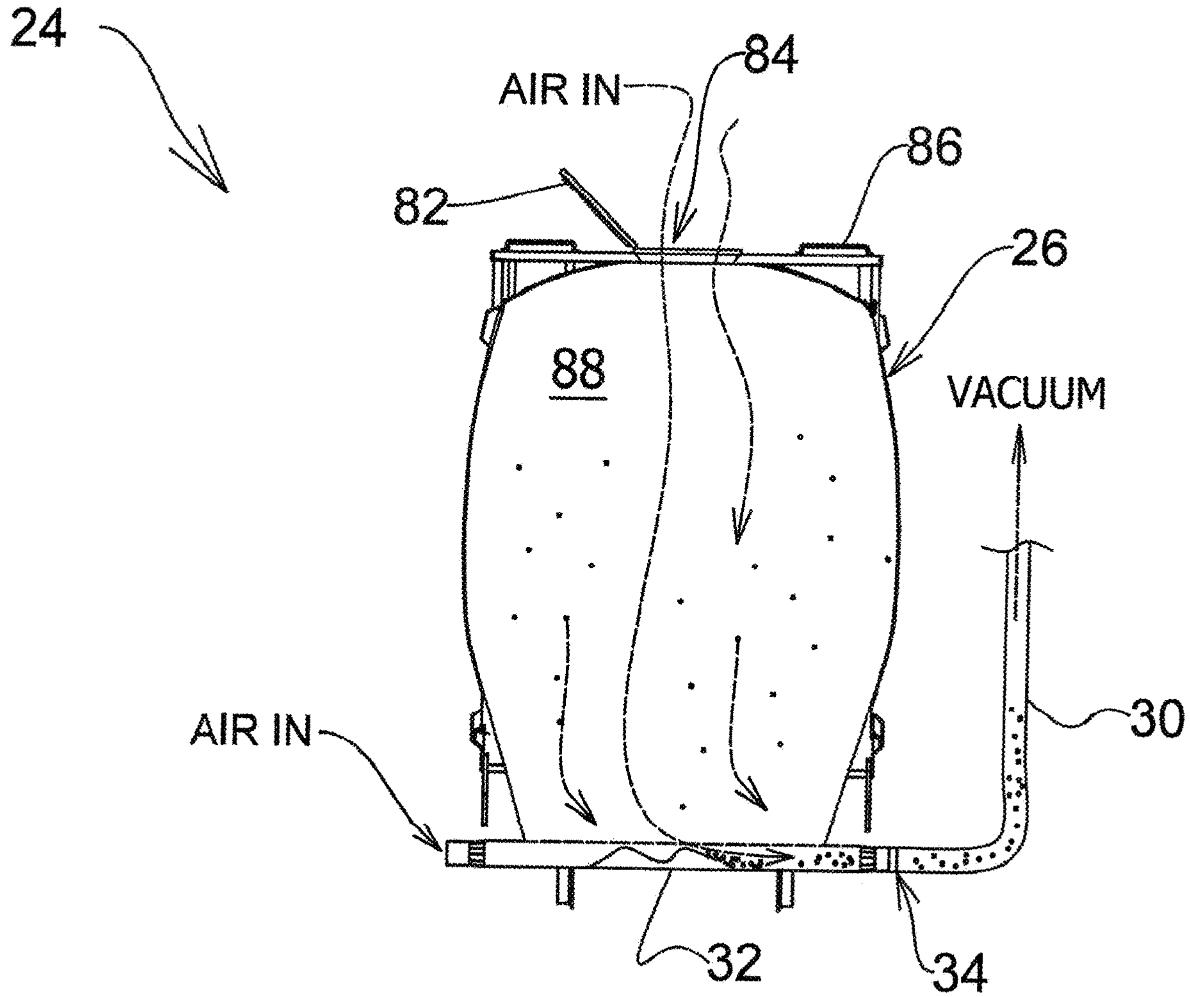
FIG. 3 is an example of air flow including particles traveling through the railcar of FIG. 2.
Figure 4:
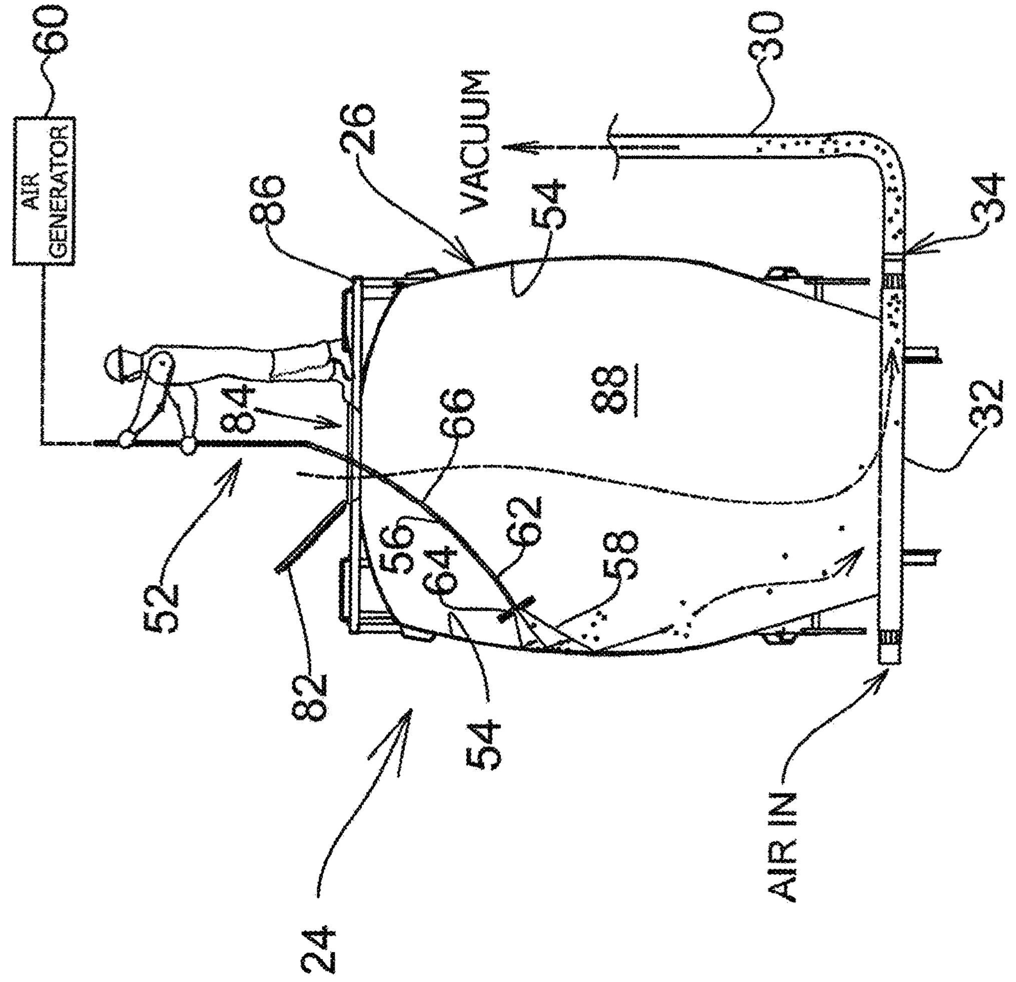
FIG. 4 a partial cross-section view of the railcar of FIG. 2 showing a person cleaning an interior of the railcar using a cleaning tool.
Figure 5:
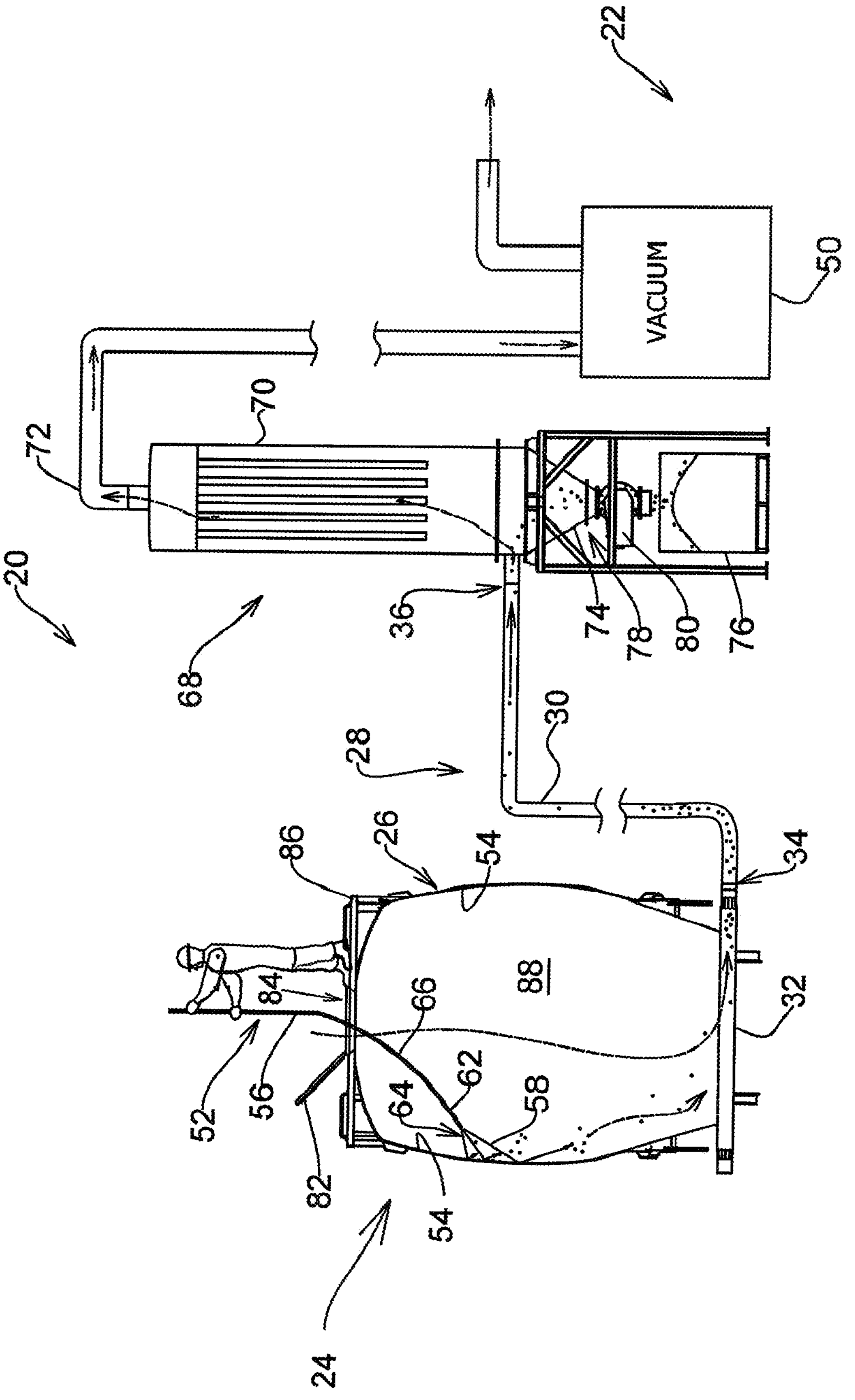
FIG. 5 is a partial cross-section view of the present cleansing system attached to a railcar.
Figure 6:
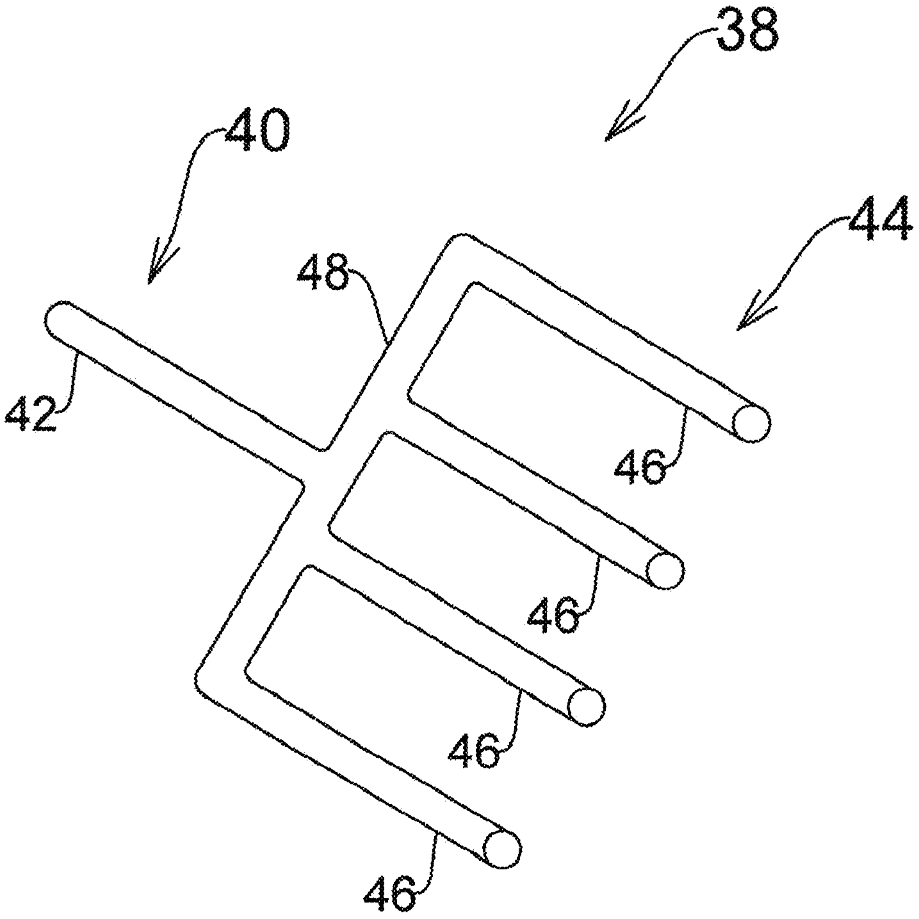
FIG. 6 is a perspective view of an embodiment of a manifold connected to the outlets of the compartments of the railcar.

Referring now to FIGS. 1-6, the present railcar cleaning system generally designated as 20, includes a vacuum generator 22 attached to each compartment of 26 of a railcar 24. More specifically, the vacuum generator 22 includes a connection assembly 28 having at least one inlet connector 30 attached to each outlet 32 associated with the compartments of the railcar. The inlet connector 30 may be a pipe, a flexible hose or any suitable connector. In an embodiment, the vacuum generator 22 includes a separate inlet connector 30 attached to each outlet 32 of each compartment 26 of the railcar 24 where a first end 34 of the inlet connector 30 is attached to the outlet 32 of the compartment 26 and a second end 36 is attached to the vacuum generator 22. For example, for a railcar having two compartments, the vacuum generator 22 has two inlet connectors 30 where one of the inlet connectors 30 is attached to each outlet 32 associated with the compartments. In another embodiment, a manifold 38 shown in FIG. 6 has a first end 40 with a vacuum connector 42 attached to the vacuum generator 22 and a second end 44 that includes a plurality of inlet connectors 46 where one of the inlet connectors is attached to each outlet 32 of the compartments 26 of the railcar 24. As shown in FIG. 6, one end of each of the inlet connectors 46 is attached to a main connector 48 that leads to the vacuum connector 42. In this embodiment, the vacuum connector 42, the main connector 48 and the inlet connectors 46 may each be a rigid pipe, a flexible pipe or hose or any suitable connector. Further, each of the inlet connectors 46 may be the same length, one or more of the inlet connectors may be a different length or all of the inlet connectors may be different lengths. Also, the connection assembly 28 may be made with a metal such as stainless steel or any suitable material or combination of materials.

The vacuum generator 22 in the present railcar cleaning system 20 includes a pneumatic device 50 operated by pressurized gas, such as pressurized air, that pneumatically conveys bulk materials, particles and air through the compartments 26 of the railcar 24 to the outlets 32 associated with each compartment and then to a desired storage location or other location. Pneumatic conveying may be performed either by generating pressure or a vacuum where a pressure system uses positive pressure and a vacuum system uses negative pressure.

The pneumatic device 50 in the present cleaning system 20 uses either dilute phase or dense phase technology to transport the material out of a railcar. Dilute phase technology is a high-velocity system where the material being conveyed is continuously suspended in the air as it is pressured or vacuumed through a pipeline. Dense phase technology commonly refers to materials that move in relatively low velocities and are not air-borne in transit, these staggered amounts are called slugs. In the illustrated embodiment, the pneumatic device is a high-velocity system that transports or moves residual material from the interior of the compartment or compartments of a railcar through an outlet to a filter assembly or storage container. It should be appreciated that the pneumatic device 50 may be any suitable pneumatic device for conveying material through and out of the compartments 26 of a railcar 24.

Referring to FIG. 5, in an embodiment, a pneumatic tool 52 is used to loosen and/or remove material that is stuck on the interior surfaces 54 of each compartment 26 of a railcar 24. In the illustrated embodiment, the pneumatic tool 52 includes a handle 56 and a nozzle or nozzles 58 attached to an end of the handle. The pneumatic tool 52 is preferably connected to an air generator 60 (FIG. 4) that supplies a pressurized gas, such as pressurized air, to the pneumatic tool 52. A tube or pipe (not shown) is connected to the handle 56 of the pneumatic tool 52 at one end and to the air generator 60 at the opposing end. The handle 56 has a hollow interior space 62 that enable the pressurized air to travel through the handle and out through the nozzle or nozzles. As shown, a user holds the handle 56 and directs the pressurized air emitted by the nozzle or nozzles 58 at an interior surface 54 of the compartment 26 to loosen and remove material from the interior surface. In another embodiment, the handle 56 includes a brush 64 (FIG. 4) positioned adjacent to the nozzle or nozzles 58 where the brush is moved along the interior surfaces 54 of the compartment 26 to further loosen and remove material from the interior surfaces 54. The nozzle or nozzles 58 may also be positioned within the head of the brush 64. In this embodiment, the handle 56 has a curved portion 66 to enable a user to reach the interior surfaces 54 of the side walls of the compartments 26. It should be appreciated that the handle 56 may be straight, a portion of the handle may be curved or the handle may be curved along the entire length of the handle. In another embodiment, the pneumatic tool 52 is connected to an arm (not shown) associated with a motor that automatically moves and rotates the brush 64 and/or nozzles 58 to move the brush and nozzles along the interior surfaces 54 of each compartment 26 of a railcar 24.

In an embodiment, the outlets 32 of the compartments 26 of the railcar 24 are connected to a filter system 68. As shown in FIG. 5, the filter system 68 includes a filter unit 70 having a filter medium or filter compartment 72 that removes material and particles from the air flowing through it. The vacuum generator 22 described above creates a vacuum within the filter system 68 such that the air from the compartments 26 flows through the filter unit 70 and out through a filter outlet 72. The filter system 68 also includes a hopper 74 that collects the material and particles filtered out of the air by the filter unit 70 and directs the material and particles to one or more containers 76 positioned below the outlet 78 of the hopper 74. The filter system 68 may include one hopper and container or a plurality of hoppers 74 and containers 76. The bottom of the hopper 74 further includes a valve 80 to control the flow of the collected material and particles to the container 76. The material and particles collected in the container 76 may be recycled or discarded.

In operation, air flows through the railcar compartments 26 (typically four compartments per railcar) by connecting the vacuum generator 22 to the outlet 32 of each compartment 26 via piping and hoses, i.e., the inlet connectors 30. The hatch 82 is associated with the inlet 84 to each compartment 26 (located on the roof 86 of the railcar 24) is opened. The hatch includes a lid that is movable between an open position shown in FIG. 1 and a closed position. Typically, there are one to three hatches 82 per compartment 26 depending on the type, size and manufacturer of the railcar 24. The vacuum generator 22 is activated and air is evacuated from the interior space 88 of the railcar compartment 26 by drawing air through the open roof hatch(es) 82 to create a high velocity air flow from the top to the bottom of each compartment 26. (See, FIGS. 1 and 2).

Granular materials and particles that are in the interior space 88 of each compartment 26 and/or in the discharge outlets 32 are carried off by the vacuum. Any dust particles which are free and in the compartments 26 and discharge outlets 32 are carried off by the vacuum. Dust particles that were suspended or falling in the air inside each compartment 26 are carried by the high velocity air flow stream to the discharge outlet 32 and carried off by the vacuum. (See FIG. 3).

Friction, static or sticky residues may cause granules or dust to stick to certain areas of the interior surfaces 54 of the compartments 26. Operators use specially adapted pneumatic tools, such as the pneumatic tool 52 shown in FIGS. 4 and 5 that use compressed air to blow, loosen and remove larger particles, granules, pellets etc. from the interior surfaces 54 and to the discharge outlets 32, where they are collected by the vacuum. Some dust particles require brushing and blowing to dislodge them as described above. Soft fibered brushes, such as brush 64, are mounted on to end of the pneumatic tool 52 so that as dust particles are brushed off the interior surfaces 54 and simultaneously blown into the vacuum stream and carried away. (See, FIG. 4).

The material and particles removed from the interior spaces 62 and the discharge outlets 32 are pneumatically conveyed via hoses and piping to a container 76 for packaging. Large amounts of leftover material and particles are taken directly to a filter system 68 (commonly known as a "baghouse" or "sockhouse") for collection as shown in FIG. 5 and described above. The filter system 68 includes the filter unit 70 that removes particles from a vacuum stream which is produced by a pump or blower and protects the equipment from being damaged by such materials entering its internal workings. The filter system 68 discharges collected materials into industry approved containers 76 and is then recycled or disposed.

In the above embodiments, the present railcar cleaning system 20 removes material and particles from the interior space of each compartment of a railcar solely using air to enhance the efficiency of cleaning of railcars while eliminating the need for chemical additives and water that are costly and require additional wastewater processing after the cleaning process is complete. In this way, the present railcar cleaning system 20 is more energy efficient and environmentally friendly comparted to conventional cleaning systems.

Figure 7:
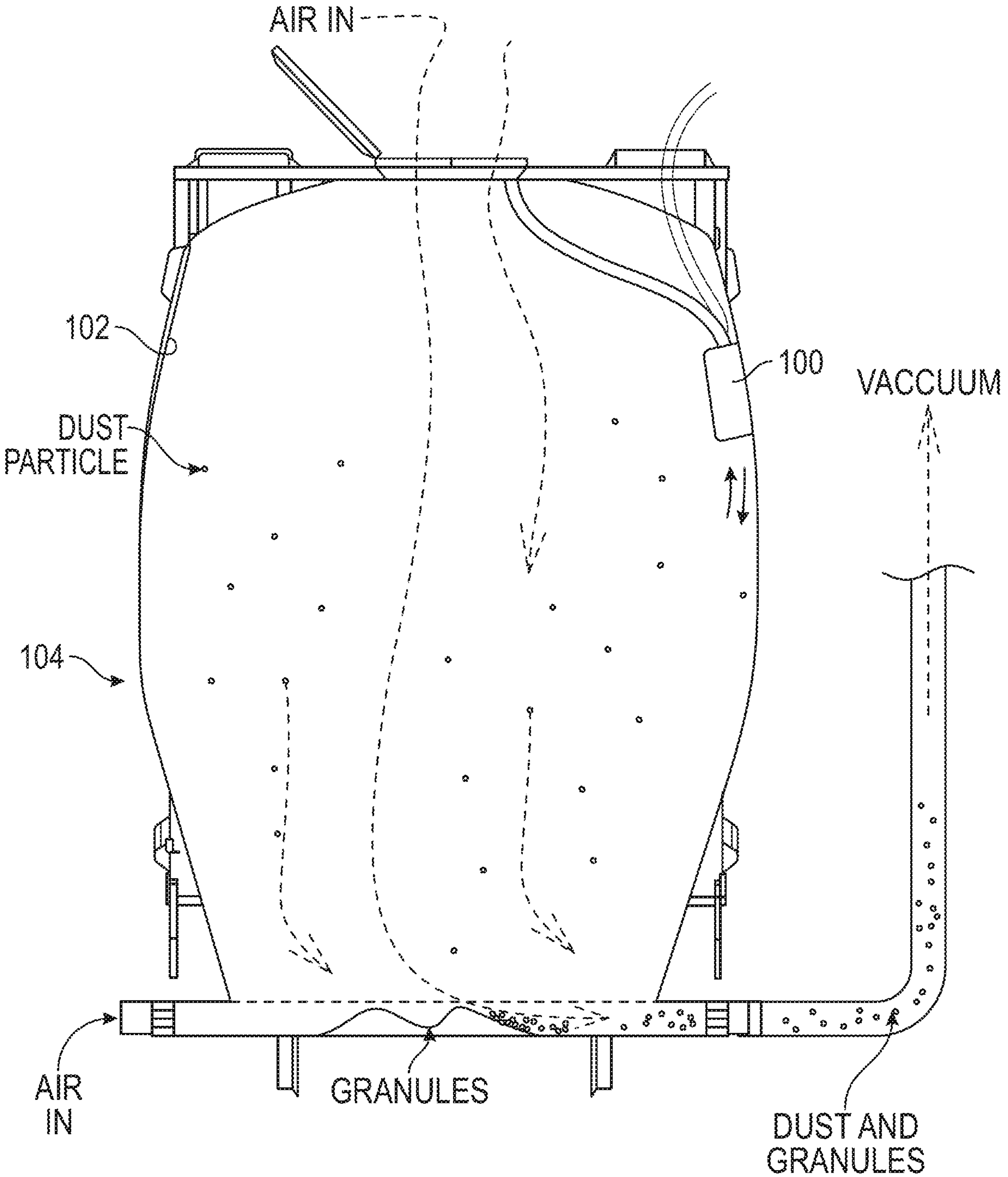
FIG. 7 is a perspective view of a vacuum unit movably attached to a wall of a storage container of a bulk transport vehicle.

Referring to FIG. 7, in another embodiment, the cleaning system includes an automatic interior vacuum unit 100 that is placed within a storage compartment, a storage vessel or a storage container 102 of a bulk transport vehicle 104, where the vacuum unit is controlled remotely by a control unit or controller having a processor. The vacuum unit 100 is movably attached to an inner surface of the storage container and moves along the inner surface while it simultaneously vacuums and brushes the inner surface. In this embodiment, the vacuum unit is configured to attach to and move along all of the inner surfaces of the storage container including straight walls, angled walls, upper walls or ceilings, bottom walls or floors and the inlets and outlets of the storage container to vacuum and remove residual particles/material and dust from the inner surface. In operation, the vacuum unit 100 vacuums or suctions and removes particles (residual material such as residual raw materials or residual product) and dust directly from the inner surfaces of the storage container 102 and conveys collected materials to a collection point within the storage container or outside of the storage container. Any materials not collected directly by the vacuum unit fall into a vacuum stream generated within the storage container by a vacuum system attached to the storage container as described above, where the vacuum stream moves through the entire interior of the storage container and directs the non-collected materials to the collection point by means of the general cleaning process. The materials at the collection point are then removed from the collection point and disposed of or recycled.

In another embodiment, a cleaning unit similar to the vacuum unit is movably attached to the inner surfaces of a storage container. The cleaning unit blows or directs air at the inner surfaces of the storage container to remove residual raw materials, residual product and/or dust from the inner surfaces. The removed materials are directed to the collection point by the vacuum stream and then removed from the storage container. It should be appreciated that any suitable automated cleaning device may be attached to the inner surfaces of the storage container and move along the inner surfaces to remove materials from the inner surfaces.

In the above embodiments, the cleaning system or cleaning process is used in a bulk transport vehicle having one or more storage containers, such as a railcar as described above, or a truck, tractor trailer, boat, ship or other suitable transport vehicle.

While particular embodiments of the present railcar cleaning system is shown and described, it will be appreciated by those skilled in the art that changes and modifications may be made thereto without departing from the invention in its broader aspects and as set forth in the following claims.

What is claimed is:

1. A bulk transport vehicle cleaning system comprising:

a vacuum unit that is independently, movably attached to an inner surface of at least one wall of a storage compartment of a bulk transport vehicle, the storage compartment having an inlet and an outlet, wherein the vacuum unit is configured to move along the inner surface and suction residual material and dust from the inner surface;

a filter system connected to said outlet; and a vacuum generator connected to said filter system, wherein said vacuum generator generates a vacuum within the storage compartment of the bulk transport vehicle so that air flows from said inlet of the storage compartment toward said vacuum generator, and wherein said filter system removes material and particles from the air.

2. The bulk transport vehicle cleaning system of claim 1, wherein the inlet to the storage compartment includes a hatch with a lid.

3. The bulk transport vehicle cleaning system of claim 1, wherein the filter system includes an inlet connector connected to said outlet of the storage compartment, wherein said inlet connector is one of a pipe or a flexible hose.

4. The bulk transport vehicle cleaning system of claim 1, wherein said filter system includes a filter unit and a hopper having an outlet.

5. The bulk transport vehicle cleaning system of claim 4, further comprising a container positioned beneath said outlet of said hopper, said container storing material removed from the air by said filter unit.

6. The bulk transport vehicle cleaning system of claim 5, wherein said hopper includes a valve attached to said outlet of said hopper, said valve configured to regulate the flow of said material to said container.

7. A bulk transport vehicle cleaning system comprising:

plurality of storage compartments of a bulk transport vehicle, each of said storage compartments including a plurality of walls, an inlet and an outlet;

a vacuum unit that is independently, movably attached to an inner surface of at least one of the walls of one or more of the storage compartments, wherein the vacuum unit is configured to move along the inner surface and suction residual material and dust from the inner surface;

a filter system connected to said outlet; and a vacuum generator connected to said filter system, wherein said vacuum generator generates a vacuum within at least one of the storage compartments of the bulk transport vehicle so that air flows from said inlet of the at least one of the storage compartments toward said vacuum generator, and wherein said filter system removes material and particles from the air.

8. The bulk transport vehicle cleaning system of claim 7, wherein the inlet of each storage compartment includes a hatch with a lid.

9. The bulk transport vehicle cleaning system of claim 7, wherein the filter system includes an inlet connector connected to each of said outlets of said storage compartments, wherein said inlet connector is one of a pipe or a flexible hose.

10. The bulk transport vehicle cleaning system of claim 7, wherein said filter system includes a filter unit and a hopper having an outlet.

11. The bulk transport vehicle cleaning system of claim 10, further comprising a container positioned beneath said outlet of said hopper, said container storing material removed from the air by said filter unit.

12. The bulk transport vehicle cleaning system of claim 10, wherein said hopper includes a valve attached to said outlet of said hopper, said valve configured to regulate the flow of said material to said container.

13. The bulk transport vehicle cleaning system of claim 1, further comprising a control unit that is in communication with said vacuum unit and configured to remotely control said vacuum unit.

14. The bulk transport vehicle cleaning system of claim 7, further comprising a control unit that is in communication with said vacuum unit and configured to remotely control said vacuum unit.

* * * * *